US008907512B2

(12) United States Patent
Kuczaj

(10) Patent No.: US 8,907,512 B2
(45) Date of Patent: Dec. 9, 2014

(54) LOAD APPARATUS AND METHOD OF USING SAME

(71) Applicant: TurboGen, LLC, Reno, NV (US)

(72) Inventor: John Kuczaj, Reno, NV (US)

(73) Assignee: TurboGen, LLC, Reno, NV (US)

( * ) Notice: Subject to any disclaimer, the term of this patent is extended or adjusted under 35 U.S.C. 154(b) by 109 days.

(21) Appl. No.: 13/682,313

(22) Filed: Nov. 20, 2012

(65) Prior Publication Data
US 2014/0138950 A1 May 22, 2014

(51) Int. Cl.
*F01D 15/10* (2006.01)

(52) U.S. Cl.
CPC ..................... *F01D 15/10* (2013.01)
USPC .......................................... 290/52

(58) Field of Classification Search
USPC ............................. 290/52; 310/54
See application file for complete search history.

(56) References Cited

U.S. PATENT DOCUMENTS

| | | | |
|---|---|---|---|
| 2,850,876 A | 9/1958 | Wood | |
| 3,260,369 A * | 7/1966 | Gruenewaelder | 210/297 |
| 3,299,722 A * | 1/1967 | Bodine, Jr. | 74/87 |
| 3,894,703 A * | 7/1975 | Velasquez | 244/17.23 |
| 3,988,049 A * | 10/1976 | Williams et al. | 439/23 |
| 4,171,938 A | 10/1979 | Pahl | |
| 4,411,637 A * | 10/1983 | Rauch | 464/180 |
| 4,421,998 A | 12/1983 | Ahner et al. | |
| 4,590,820 A | 5/1986 | Hambric | |
| 4,626,114 A | 12/1986 | Phillips | |
| 4,679,661 A | 7/1987 | Gibson | |
| 5,027,024 A | 6/1991 | Slayton | |
| 5,043,592 A * | 8/1991 | Hochstrasser | 290/52 |
| 5,133,122 A | 7/1992 | Kawasaki et al. | |
| 5,544,484 A | 8/1996 | Voss et al. | |
| 5,896,895 A | 4/1999 | Simpkin | |
| 5,906,098 A | 5/1999 | Woollenweber et al. | |
| 6,040,647 A | 3/2000 | Brown et al. | |
| 6,062,835 A | 5/2000 | Acharya et al. | |
| 6,127,763 A | 10/2000 | Nakamura et al. | |
| 6,132,194 A | 10/2000 | Wender et al. | |
| 6,531,802 B2 | 3/2003 | Umeda | |
| 6,700,296 B1 | 3/2004 | Oohashi et al. | |
| 6,726,443 B2 | 4/2004 | Collins et al. | |
| 6,750,572 B2 | 6/2004 | Tornquist et al. | |
| 6,763,812 B2 | 7/2004 | Wheeler, Jr. et al. | |
| 6,859,992 B2 | 3/2005 | Gubbels | |
| 6,867,530 B2 | 3/2005 | Gamm et al. | |
| 6,989,622 B1 | 1/2006 | Chen et al. | |
| 7,201,622 B2 | 4/2007 | Hoi | |

(Continued)

OTHER PUBLICATIONS

US 8,063,521, 11/2011, Huynh (withdrawn).

*Primary Examiner* — Tho D Ta
(74) *Attorney, Agent, or Firm* — Manita Rawat; Duane Morris LLP

(57) ABSTRACT

A load apparatus is provided. The load apparatus generally comprises a load that is configured to convert mechanical rotational energy to electrical energy for a power output. A rotor assembly is coupled to the load, wherein the rotor assembly includes a rotor shaft that is configured to rotate within at least a portion of the load. A quill shaft is coupled to the rotor shaft, wherein the quill shaft is configured to couple the rotor shaft to a drive shaft of a machine such that the rotor shaft is axially and/or radially isolated from the drive shaft to facilitate rotordynamic isolation between the load apparatus and the machine.

20 Claims, 5 Drawing Sheets

(56) References Cited

U.S. PATENT DOCUMENTS

| | | |
|---|---|---|
| 7,239,062 B2 | 7/2007 | Vacheron et al. |
| 7,449,794 B2 | 11/2008 | Guey et al. |
| 7,538,461 B2 | 5/2009 | McMillan et al. |
| 7,714,479 B2 | 5/2010 | Seneff et al. |
| 7,854,265 B2 | 12/2010 | Zimmermann |
| 7,948,105 B2 | 5/2011 | Agrawal et al. |
| 8,008,822 B2 | 8/2011 | Hopewell et al. |
| 8,069,552 B2 | 12/2011 | Yamashita |
| 8,118,570 B2 | 2/2012 | Meacham et al. |
| 8,148,860 B2 | 4/2012 | Wong et al. |
| 8,384,232 B2 | 2/2013 | Myers et al. |
| 8,395,288 B2 | 3/2013 | Huynh |
| 2004/0175277 A1 | 9/2004 | Cox et al. |
| 2006/0131978 A1 | 6/2006 | Hirzel et al. |
| 2009/0151934 A1 | 6/2009 | Heidecke et al. |
| 2010/0084938 A1 | 4/2010 | Palmer et al. |
| 2011/0049894 A1 | 3/2011 | Green |
| 2012/0045352 A1 | 2/2012 | Lawyer et al. |

\* cited by examiner

LOAD APPARATUS AND METHOD OF USING SAME

BACKGROUND

The field of the invention relates generally to power systems and, more particularly, to a load apparatus that may be used in power systems.

At least some known systems, such as power systems, use at least one machine that is coupled to a load. The machine may be a turbine engine that generates mechanical rotational energy. The load may be an electrical system, such as an electrical generator or inverter, which converts the mechanical energy to electrical energy for a power output. The load may also be coupled to an energy storage device such that some of the power output may be stored for later use. For example, at least some known power systems provide bi-directional electrical energy or power flow, wherein the power output from the load may be transferred to the turbine engine to power the turbine engine or the power output may be delivered to, for example, the energy storage device for storage.

Some power systems that provide bi-directional power flow may use high speed generators to facilitate an increased power density. At least some known high speed generators are directly coupled to the turbine engine. More specifically, a rotating element, such as a drive shaft, of the turbine engine is directly coupled with a rotor shaft of the generator. The drive shaft rotates to enable the turbine engine to generate mechanical rotational energy. As the drive shaft rotates, the generator rotor shaft rotates and the generator is able to convert the mechanical energy to electrical energy.

Because there is no rotordynamic isolation between the high speed generator and the turbine engine, the drive shaft of the turbine engine may impact the rotor shaft of the high speed generator, or vice versa. For example, the high rotational speeds that are implemented may apply centrifugal forces on the drive shaft and/or the rotor shaft that may cause misalignment of the rotor shaft and/or the generator with respect to the drive shaft and/or the turbine engine. Such misalignment may lead to a failure of at least one component of the power system, prevent proper bi-directional power flow, and/or adversely affect the overall operation of the power system.

Accordingly, there is a need for a load that is able to facilitate bi-directional power flow, and wherein the load is rotordynamically isolated from the machine that it is coupled to.

BRIEF DESCRIPTION

In an exemplary embodiment, a load apparatus is provided. The load apparatus generally comprises a load that is configured to convert mechanical rotational energy to electrical energy for a power output. A rotor assembly is coupled to the load, wherein the rotor assembly includes a rotor shaft that is configured to rotate within at least a portion of the load. A quill shaft is coupled to the rotor shaft, wherein the quill shaft is configured to couple the rotor shaft to a drive shaft of a machine such that the rotor shaft is axially and/or radially isolated from the drive shaft to facilitate rotordynamic isolation between the load apparatus and the machine.

In another embodiment, a power system is provided. The power system includes a machine that includes a drive shaft. A load apparatus is coupled to the machine. The load apparatus includes a load that is configured to convert mechanical rotational energy to electrical energy for a power output. A rotor assembly is coupled to the load, wherein the rotor assembly includes a rotor shaft that is configured to rotate within at least a portion of the load. A quill shaft is coupled to the rotor shaft, wherein the quill shaft is configured to couple the rotor shaft to the drive shaft such that the rotor shaft is axially and/or radially isolated from the drive shaft to facilitate rotordynamic isolation between the load apparatus and the machine. Moreover, the power system includes an energy storage device that is coupled to the load apparatus.

In yet another embodiment, a method of using a load apparatus is provided. A load that is configured to convert mechanical rotational energy to electrical energy for a power output is provided. A rotor assembly is coupled to the load, wherein the rotor assembly includes a rotor shaft that is configured to rotate within at least a portion of the load. A quill shaft is coupled to the rotor shaft, wherein the quill shaft is configured to couple the rotor shaft to a drive shaft of a machine such that the rotor shaft is axially and/or radially isolated from the drive shaft to facilitate rotordynamic isolation between the load apparatus and the machine.

DETAILED DESCRIPTION

The exemplary systems, apparatus, and methods described herein provide a load apparatus for use in a power system, wherein the load apparatus is able to facilitate bi-directional power flow within the power system and the load apparatus is coupled to a machine such that the load apparatus is rotordynamically isolated from the machine. The load apparatus includes a load and a rotor assembly that is coupled to the load, wherein the rotor assembly includes a rotor shaft that is configured to rotate within at least a portion of the load. The load apparatus also includes the use of a quill shaft that is configured to couple the rotor shaft to a drive shaft of the machine such that the rotor shaft is axially and/or radially isolated from the drive shaft to facilitate rotordynamic isolation between the load apparatus and the machine.

Figure 1:
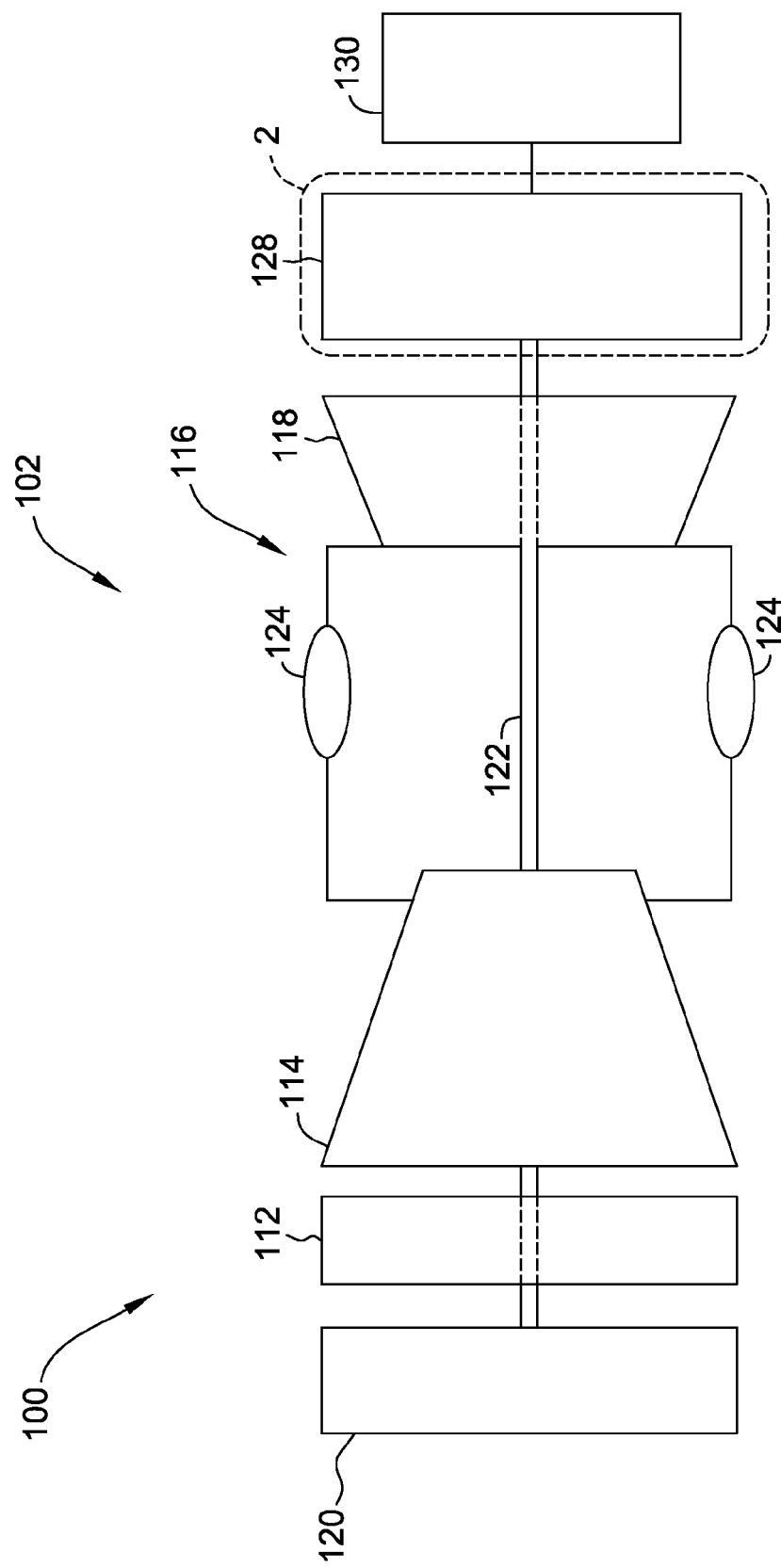
FIG. 1 is a block diagram of an exemplary power system.

FIG. 1 illustrates an exemplary power system 100. Although the exemplary embodiment illustrates a power system, the present disclosure is not limited to power systems, and one of ordinary skill in the art will appreciate that the current disclosure may be used in connection with any type of system. In the exemplary embodiment, the power system 100 includes a machine. More specifically, in the exemplary embodiment, machine is a gas turbine engine 102. While the exemplary embodiment includes a gas turbine engine, the present invention is not limited to any one particular type of machine, and one of ordinary skill in the art will appreciate that the current disclosure may be used in connection with other types of machines. For example, machine may be a compressor, a pump, a turbocharger, and/or various types of turbines.

Moreover, in the exemplary embodiment, the turbine engine 102 includes an intake section 112, a compressor section 114 coupled downstream from the intake section 112, a combustor section 116 coupled downstream from the compressor section 114, a turbine section 118 coupled downstream from the combustor section 116, and an exhaust section 120. It should be noted that, as used herein, the term "couple" is not limited to a direct mechanical, thermal, communication, and/or an electrical connection between components, but may also include an indirect mechanical, thermal, communication and/or electrical connection between multiple components.

The turbine section 118, in the exemplary embodiment, is coupled to the compressor section 114 via a drive shaft 122. In the exemplary embodiment, the combustor section 116 includes a plurality of combustors 124. The combustor section 116 is coupled to the compressor section 114 such that each combustor 124 is positioned in flow communication with the compressor section 114. The turbine section 118 is coupled to the compressor section 114 and to a load apparatus 128 via the drive shaft 122. In the exemplary embodiment, the load apparatus 128 includes a load (not shown in FIG. 1) that is an electrical system, such as a high speed electrical generator or inverter. The load apparatus 128 is coupled to an energy storage device 130, such as a battery. In the exemplary embodiment, the compressor section 114 and the turbine section 118 includes at least one rotor disk assembly (not shown) that is coupled to the drive shaft 122.

During operation, the intake section 112 channels air towards the compressor section 114 wherein the air is compressed to a higher pressure and temperature prior to being discharged towards the combustor section 116. The compressed air is mixed with fuel and other fluids and ignited to generate combustion gases that are channeled towards the turbine section 118. More specifically, fuel, such as natural gas and/or fuel oil, air, diluents, and/or Nitrogen gas ($N_2$), is injected into combustors 124, and into the air flow. The blended mixtures are ignited to generate high temperature combustion gases that are channeled towards the turbine section 118. The turbine section 118 converts the thermal energy from the gas stream to mechanical rotational energy, as the combustion gases impart rotational energy to the turbine section 118 and to the rotor disk assembly.

The mechanical rotational energy is converted to electrical energy via the load apparatus 128 for a power output. As explained in more detail below, the load apparatus 128 facilitates bi-directional power flow within the power system 100 such that the power output from the load apparatus 128 may be transferred to the turbine engine 102 to power the turbine engine 102 or the power output may be delivered to, for example, the energy storage device 130.

In the exemplary embodiment, the mechanical rotational energy that is generated by the turbine section 118 is enabled by the rotation of the drive shaft 122. As the drive shaft 122 rotates, at least a portion of the load apparatus 128 rotates. More specifically, a rotor shaft (not shown in FIG. 1) of the load apparatus 128 rotates. Due to the high rotational speeds implemented by the drive shaft 122 and/or the rotor shaft, mechanical stress may be endured by each. The mechanical stress may cause misalignment of the rotor shaft and/or the load apparatus 128 with respect to the drive shaft 122 and/or the turbine engine 102. However, as described in more detail below, the load apparatus 128 is rotordynamically isolated from the turbine engine 102. Accordingly, mechanical stress and/or misalignment of the rotor shaft and/or the load apparatus 128 with respect to the drive shaft 122 and/or the turbine engine 102 may be inhibited.

Figure 2:
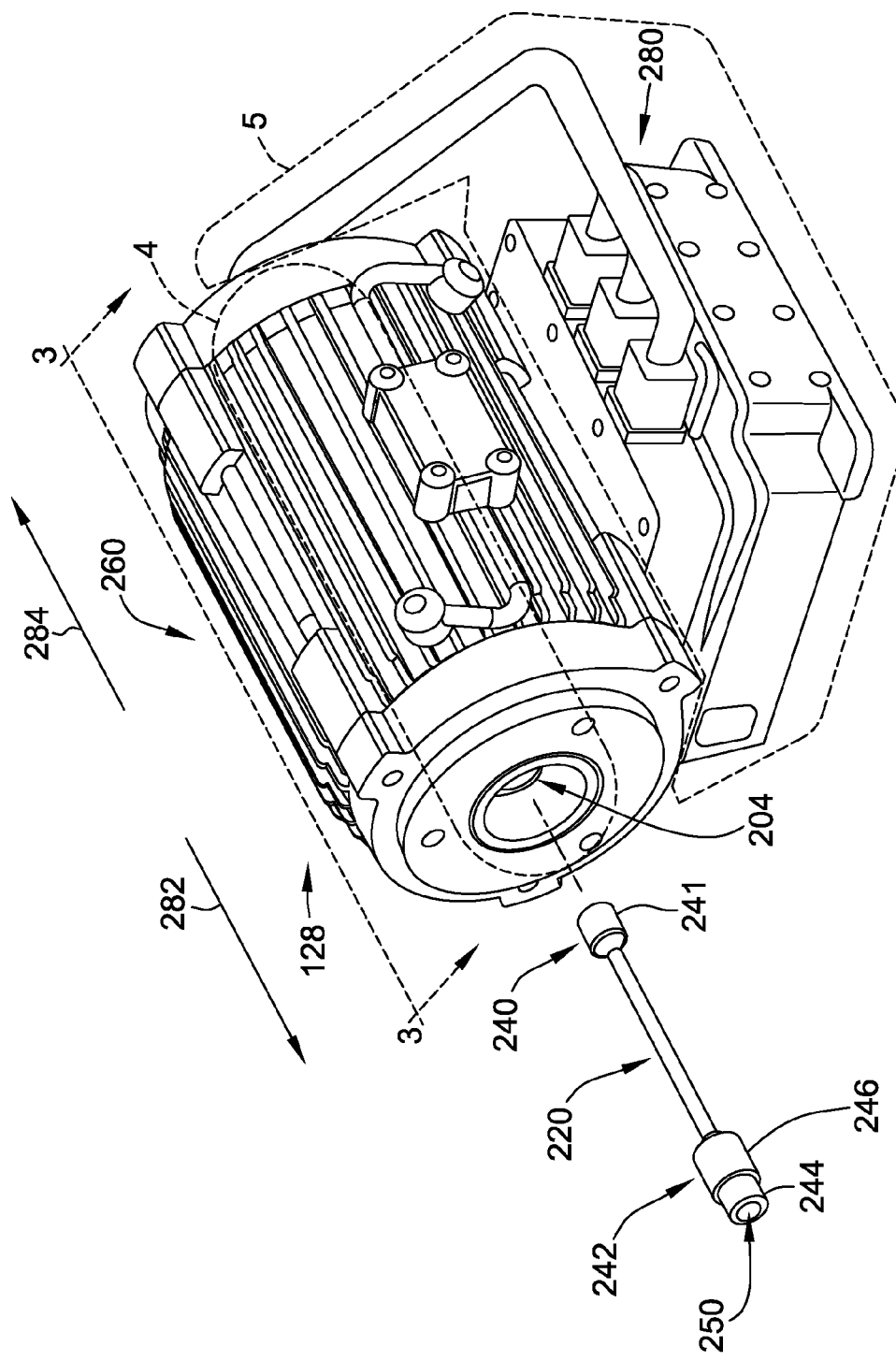
FIG. 2 is a partially exploded perspective view of an exemplary load apparatus that may be used with the power system shown in FIG. 1 and taken from area 2.
Figure 3:
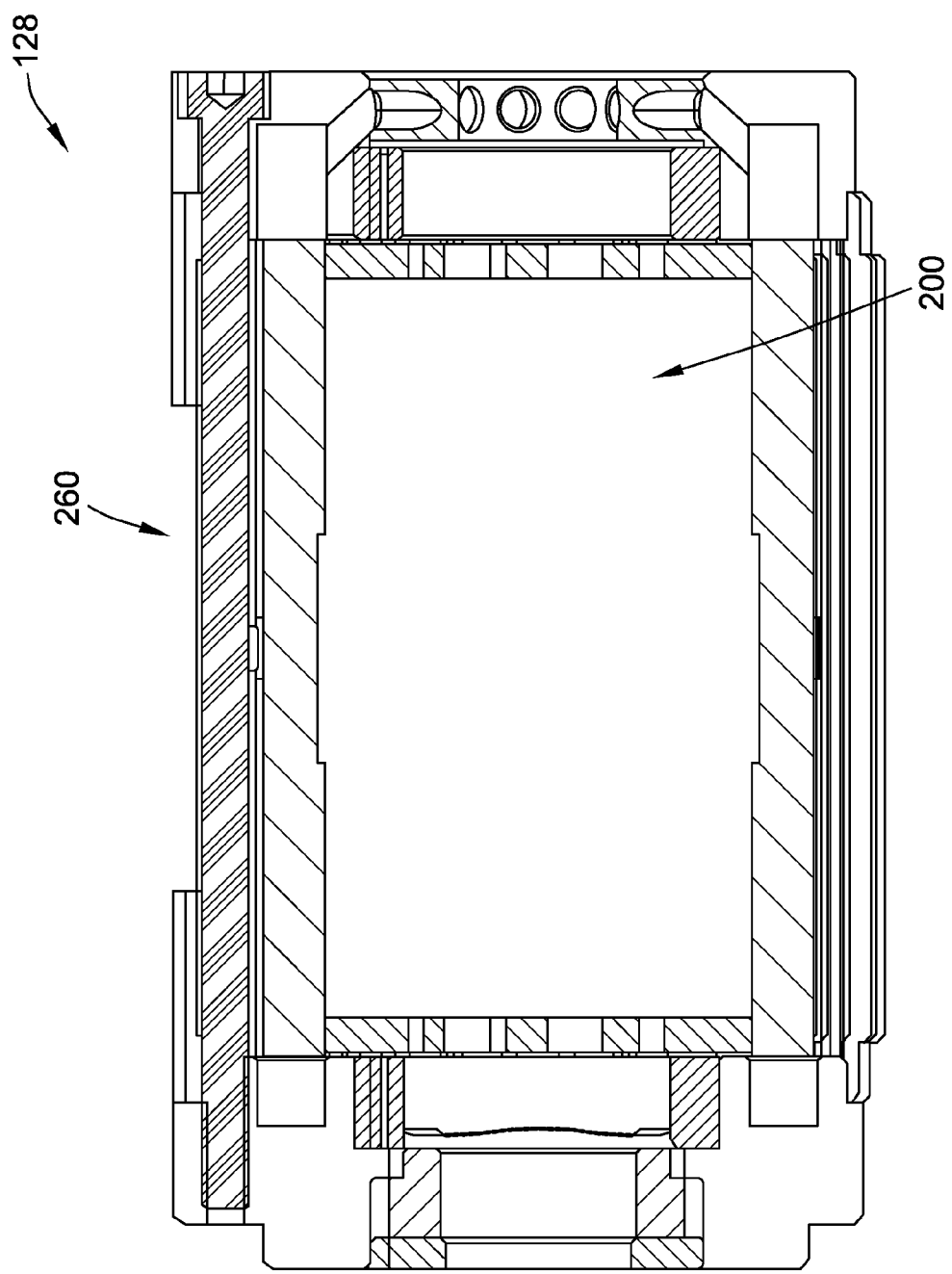
FIG. 3 is a cross-sectional view of a portion of the load apparatus shown in FIG. 2 and taken along line 3-3.
Figure 4:
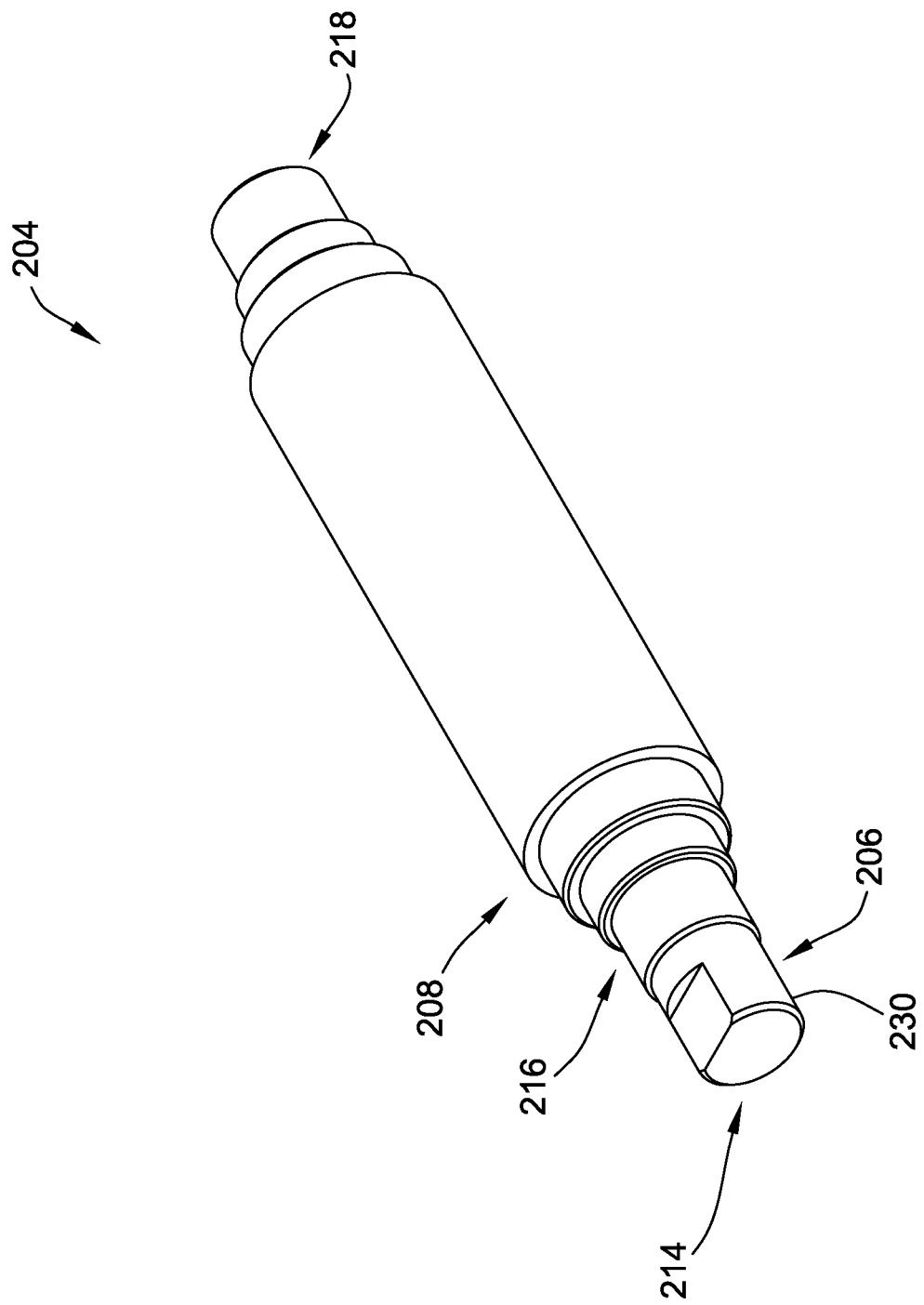
FIG. 4 is a perspective view of a portion of the load apparatus shown in FIG. 2 and taken from area 4.

FIG. 2 is a partially exploded perspective view of the load apparatus 128 taken from area 2 (shown in FIG. 1). FIG. 3 is a cross-sectional view of a portion of the load apparatus 128 taken along line 3-3 (shown in FIG. 2). FIG. 4 is a perspective view of a portion of the load apparatus 128 taken from area 4 (shown in FIG. 2). In the exemplary embodiment, the load apparatus 128 includes a load 200 that is a high speed generator configured to convert mechanical rotational energy to electrical energy for a power output. Alternatively, the load 200 may be any suitable type of device or system that is configured to generate electrical energy that enables the load apparatus 128 and/or the power system 100 (shown in FIG. 1) to function as described herein.

A rotor assembly 204 is coupled to the load 200 such that at least a portion of the load 200 substantially circumscribes at least a portion of the rotor assembly 204. In the exemplary embodiment, the rotor assembly 204 is the rotor assembly described in co-pending U.S. patent application Ser. No. 13/682,378 entitled ROTOR ASSEMBLY AND METHOD OF USING SAME filed Nov. 20, 2012, which is incorporated herein by reference in its entirety. More specifically, the rotor assembly 204 includes a substantially cylindrical rotor shaft 206 that is coupled to a sleeve apparatus 208 such that at least a portion of the rotor shaft 206 is positioned within the sleeve apparatus 208 (FIG. 4). In the exemplary embodiment, the rotor shaft 206 includes a first end portion 214, a middle portion 216, and a second portion 218. The rotor shaft 206 is positioned within the sleeve apparatus 208 such that at least a portion of the middle portion 216 is positioned within the sleeve apparatus 208, and the first end portion 214 and the second end portion 218 are not positioned within the sleeve apparatus 208. As such, the rotor shaft 206 is configured to rotate within at least a portion of the load 200.

In the exemplary embodiment, the second end portion 218 of the rotor shaft 206 has a diameter that is substantially equal to the diameter of the middle portion 216. The first end portion 214 is configured to be removably coupled to a quill shaft 220. More specifically, in the exemplary embodiment, the first end portion 214 includes a first surface 230 that is substantially arcuate and a second surface 232 that is substantially planar such that the first end portion is positionable within an opening (not shown) on a first end portion 240 of the quill shaft 120. For example, the opening on the first end portion 240 of the quill shaft 120 is configured to receive the first end portion 214 of the rotor shaft 206. Moreover, the first end portion 240 of the quill shaft 120 includes a splined engagement member 241 to facilitate the coupling between the first end portion 240 of the quill shaft 120 and the first end portion 214 of the rotor shaft 206.

The quill shaft 220, in the exemplary embodiment, is configured to couple the rotor shaft 206 to the drive shaft 122 (shown in FIG. 1). More specifically, while the first end portion 240 of the quill shaft 220 is configured to couple to a first end portion 214 of the rotor shaft 217, a second end portion 242 of the quill shaft 220 is configured to couple to an end portion (not shown) of the drive shaft 122. In the exemplary embodiment, the second end portion 242 of the quill shaft 220 includes a substantially cylindrical interior portion 244 and a substantially cylindrical exterior portion 246 that substantially circumscribes at least a portion of the interior portion 244. An opening 250 is defined within the interior portion 244 such that an end portion of the drive shaft 122 is positionable within the opening 250. Accordingly, the rotor shaft 206 is coupled to the drive shaft 122 via the quill shaft 220 such that the rotor shaft 206 is axially and/or radially isolated from the drive shaft 122 to facilitate rotordynamic isolation between the load apparatus 128 and the turbine engine 102 (shown in FIG. 1). More specifically, in the exemplary embodiment, the quill shaft 220 is configured to facilitate axial freedom of movement that enables the drive shaft 122 to float axially and independently of the axial movement of the rotor shaft 206.

The load apparatus 128 includes a housing apparatus 260 that is coupled to the load 200 and to the rotor assembly 204 such that the housing apparatus 260 substantially encloses at least a portion of the load 200 and at least a portion of rotor assembly 204 therein. In the exemplary embodiment, the housing apparatus 260 is the housing apparatus described in co-pending U.S. patent application Ser. No. 13/682,357 entitled HOUSING APPARATUS AND METHOD OF USING SAME filed Nov. 20, 2012, which is incorporated herein by reference in its entirety.

In the exemplary embodiment, the load apparatus 128 also includes a control system 280 that is coupled to the load 200, wherein the control system 280 is configured to control the power output produced by the load 128. More specifically, in the exemplary embodiment, the control system 280 is configured to control channeling the power output produced by the load 200 in a first direction 282 towards the turbine engine 102 such that the power output may be used by the turbine engine 102 or in a second direction 284 toward the energy storage device 130 such that the power output may be stored for later use by the power system 100.

During operation, the turbine section 118 (shown in FIG. 1) converts the thermal energy from the gas stream to mechanical rotational energy, as the combustion gases impart rotational energy to the turbine section 118 and to a rotor disk assembly (not shown). The mechanical rotational energy is then converted to electrical energy via the load 200. In the exemplary embodiment, the mechanical rotational energy that is generated by the turbine section 118 is enabled by the rotation of the drive shaft 122. As the drive shaft 122 rotates, the rotor assembly 204 rotates. More specifically, the rotor shaft 206 of the rotor assembly 204 rotates. Due to the high rotational speeds implemented by the drive shaft 122 and/or the rotor shaft 206, the drive shaft and/or the rotor shaft 206 may undergo mechanical stress that results in a misalignment of the rotor shaft 206, the rotor assembly 204, and/or the load 200 with respect to the drive shaft 122 and/or the turbine engine 102.

However, because the rotor shaft 206 is coupled to the drive shaft 122 via the quill shaft 220, the rotor shaft 206 is axially and/or radially isolated from the drive shaft 122. As such, there is rotordynamic isolation between the load apparatus 128 and the turbine engine 102. As a result, impact to the rotor shaft 206 from rotational deviations that the drive shaft 122 may endure is inhibited. Similarly, impact on the drive shaft 122 from rotational deviations that the rotor shaft 206 may endure is inhibited. Accordingly, mechanical stress and/or misalignment of the rotor shaft and/or the load apparatus 128 with respect to the drive shaft 122 and/or the turbine engine 102 may be prevented.

Moreover, the load apparatus 128 is configured to thermally isolate the turbine engine 102 from the load apparatus 128. As such, heat that is dissipating from the turbine engine 102 does not substantially impact the load apparatus. Accordingly, the potentially negative performance effects of the thermally limited components of the turbine engine 102 and/or the load apparatus 128 are substantially reduced. The load apparatus 128 is also configured to substantially reduce the available heat transfer area to propagate heat conductivity to the turbine engine 102, and provide flexibility with cooling options that can be applied to, for example, attachment components.

Figure 5:
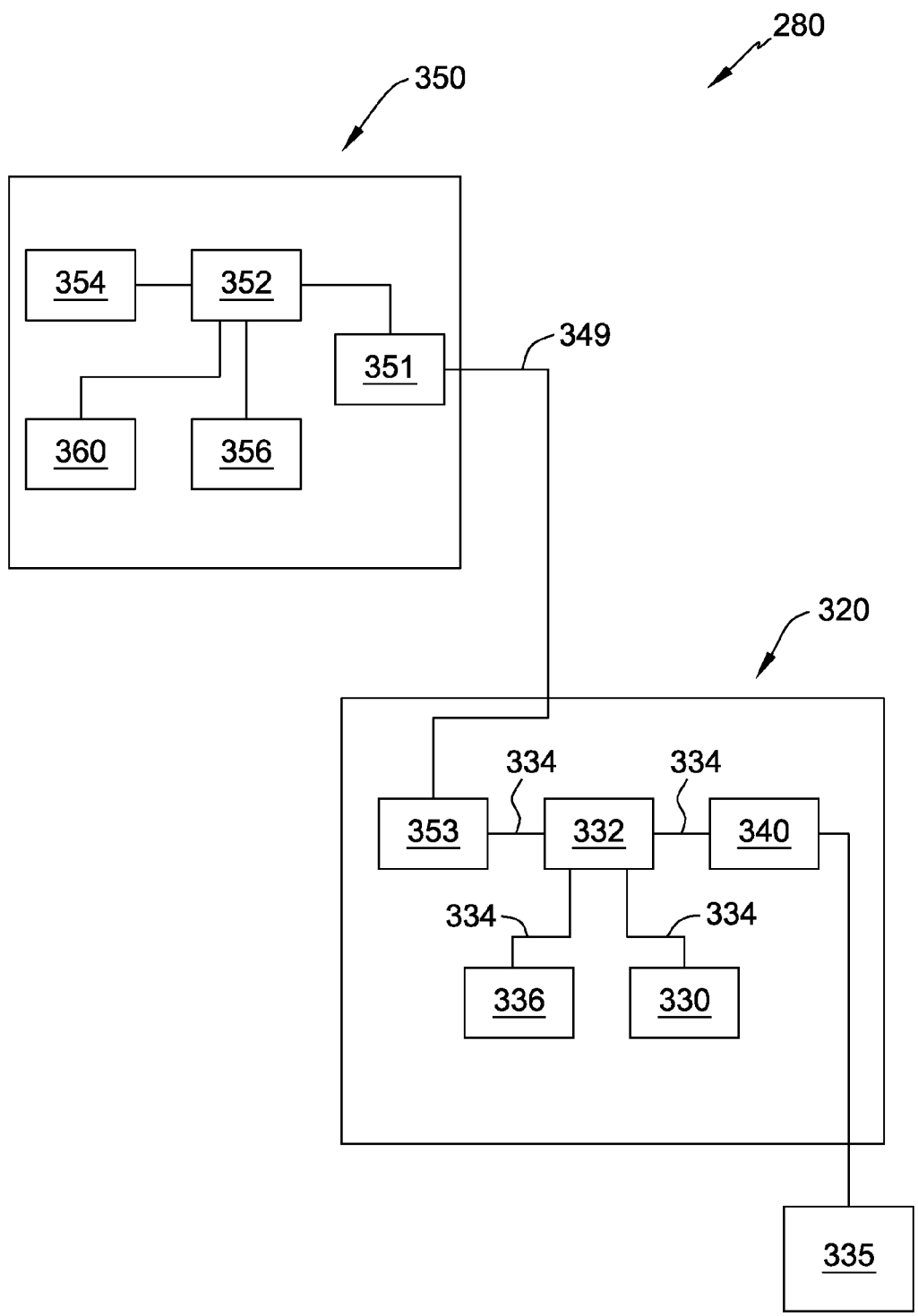
FIG. 5 is a block diagram of a portion of the load apparatus shown in FIG. 2 and taken from area 5.

FIG. 5 is a block diagram of the control system 280 taken from area 5 (shown in FIG. 2). In the exemplary embodiment, the control system 280 includes a controller 320 that is operatively coupled to the load 200 (shown in FIG. 3). More specifically, the controller 320 may be coupled to, for example, at least one control valve (not show). In the exemplary embodiment, the controller 320 is configured to control the valve to control the power output being channeled in either the first direction 282 (shown in FIG. 2) or the second direction 284 (shown in FIG. 2). The controller 320 is also configured to change the power output flow from the first direction 282 to the second direction 284 and/or from the second direction 284 to the first direction 282. The controller 320 is enabled to facilitate operative features of the valve, via features that include, without limitation, receiving permissive inputs, transmitting permissive outputs, and transmitting opening and closing commands.

In the exemplary embodiment, the controller 320 may be a real-time controller and may include any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, the controller 320 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

In the exemplary embodiment, the controller 320 includes a memory device 330 that stores executable instructions and/or one or more operating parameters representing and/or indicating an operating condition of the load apparatus 128 and/or the power system 100 (shown in FIG. 1). In the exemplary embodiment, the controller 320 also includes a processor 332 that is coupled to the memory device 330 via a system bus 334. In one embodiment, the processor 332 may include a processing unit, such as, without limitation, an integrated circuit (IC), an application specific integrated circuit (ASIC), a microcomputer, a programmable logic controller (PLC), and/or any other programmable circuit. Alternatively, the processor 332 may include multiple processing units (e.g., in a multi-core configuration). The above examples are exemplary only, and thus are not intended to limit in any way the definition and/or meaning of the term "processor."

Moreover, in the exemplary embodiment, the controller 320 includes a control interface 336 that is coupled to the valve and that is configured to control an operation of the valve. For example, the processor 332 may be programmed to generate one or more control parameters that are transmitted to the control interface 336. The control interface 336 may then transmit a control parameter to modulate, open, or close the valve.

Various connections are available between the control interface 336 and the valve. Such connections may include, without limitation, an electrical conductor, a low-level serial data connection, such as Recommended Standard (RS) 232 or RS-485, a high-level serial data connection, such as USB, a field bus, a PROFIBUS®, or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside power system 100) network connection, whether wired or wireless.

IEEE is a registered trademark of the Institute of Electrical and Electronics Engineers, Inc., of New York, N.Y. BLUETOOTH is a registered trademark of Bluetooth SIG, Inc. of Kirkland, Wash. PROFIBUS is a registered trademark of Profibus Trade Organization of Scottsdale, Ariz.

In the exemplary embodiment, the control system 280 includes at least one sensor 335 that is coupled to the load 200 and to the controller 320. More specifically, in the exemplary embodiment, the controller 320 includes a sensor interface 340 that is coupled to the sensor 335. In the exemplary embodiment, the sensor 335 is positioned in close proximity to, and coupled to at least a portion of the load 200. Alternatively, the sensor 335 may be coupled various other components within the power system 100. In the exemplary embodiment, the sensor 335 is configured to detect the level of the power output being produced by the load 200. Alternatively, the sensor 335 may detect various other operating parameters that enable the load apparatus 128 and/or the power system 100 to function as described herein.

The sensor 335 transmits a signal corresponding to a power output detected for the load 200 to the controller 320. The sensor 335 may transmit a signal continuously, periodically, or only once, for example. Other signal timings may also be contemplated. Furthermore, the sensor 335 may transmit a signal either in an analog form or in a digital form. Various connections are available between the sensor interface 340 and the sensor 335. Such connections may include, without limitation, an electrical conductor, a low-level serial data connection, such as RS 232 or RS-485, a high-level serial data connection, such as USB or IEEE® 1394, a parallel data connection, such as IEEE® 1284 or IEEE® 488, a short-range wireless communication channel such as BLUETOOTH®, and/or a private (e.g., inaccessible outside power system 100) network connection, whether wired or wireless.

The control system 280 may also include a user computing device 350 that is coupled to the controller 320 via a network 349. More specifically, the user computing device 350 includes a communication interface 351 that is coupled to a communication interface 353 contained within the controller 320. The user computing device 350 includes a processor 352 for executing instructions. In some embodiments, executable instructions are stored in a memory device 354. The processor 352 may include one or more processing units (e.g., in a multi-core configuration). The memory device 354 is any device allowing information, such as executable instructions and/or other data, to be stored and retrieved.

User computing device 350 also includes at least one media output component 356 for use in presenting information to a user. The media output component 356 is any component capable of conveying information to the user. Media output component 356 may include, without limitation, a display device (not shown) (e.g., a liquid crystal display (LCD), an organic light emitting diode (OLED) display, or an audio output device (e.g., a speaker or headphones)).

Moreover, in the exemplary embodiment, the user computing device 350 includes an input interface 360 for receiving input from the user. The input interface 360 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component 356 and the input interface 360.

During operation, a user may initially input a predefined threshold value for a power output from the load 200 via the input interface 360. The predefined threshold value may be programmed with the user computing device 350 and/or the controller 320. When the turbine engine 102 (shown in FIG. 1) commences operation, mechanical rotational energy is generated. When the mechanical rotational energy is converted to electrical energy via the load 200 for a power output, the output is detected by the sensor 335. The sensor 335 then transmits a signal representative of the power output to the controller 320.

Depending on whether the power output is less than, greater than, or equal to the predefined threshold, the controller 320 will transmit a control parameter to the valve. For example, in the exemplary embodiment, if the power output exceeds the predefined threshold, the controller 320 will transmit a control parameter to the valve such that electrical energy (i.e. power output) is channeled in the second direction 284 towards the energy storage device 130 such that the power output may be stored for later use by the power system 100. If the power output is below the predefined threshold, the controller 320 may transmit a control parameter to the valve such that electrical energy is channeled in the first direction 282 towards the turbine engine 102 such that the power output may be used by the turbine engine 102 to generate additional power.

Due to the bi-directional capabilities of the power system, the high rotational speeds implemented by the drive shaft 122 (shown in FIG. 1) and/or the rotor shaft 206 (shown in FIG. 4) may vary or cause deviations. Such rotational variations and/or deviations may cause the rotor shaft 206 and/or the drive shaft to undergo mechanical stress that results in a misalignment of the rotor shaft 206, the rotor assembly 204 (shown in FIGS. 2 and 4), and/or the load 200 with respect to the drive shaft 122 and/or the turbine engine 102. However, because the rotor shaft 206 is coupled to the drive shaft 122 via the quill shaft 220 (shown in FIG. 2), the rotor shaft 206 is axially and/or radially isolated from the drive shaft 122. As such, there is rotordynamic isolation between the load apparatus 128 and the turbine engine 102. Accordingly, mechanical stress and/or misalignment of the rotor shaft and/or the load apparatus 128 with respect to the drive shaft 122 and/or the turbine engine 102 may be inhibited even when there is bi-directional power flow within the power system 100.

As compared to known power systems that provide bi-directional power flow, the embodiments described herein provide a load apparatus for use in a power system, wherein the load apparatus is able to facilitate bi-directional power flow and the load apparatus is coupled to a machine such that the load apparatus is rotordynamically isolated from the machine. The load apparatus includes a load and a rotor assembly that is coupled to the load, wherein the rotor assembly includes a rotor shaft that is configured to rotate within at least a portion of the load. The load apparatus also includes the use of a quill shaft that is configured to couple the rotor shaft to a drive shaft of the machine such that the rotor shaft is axially and/or radially isolated from the drive shaft to facilitate rotordynamic isolation between the load apparatus and the machine.

Exemplary embodiments of systems, apparatus, and methods are described above in detail. The systems, apparatus, and methods are not limited to the specific embodiments described herein, but rather, components of each system, apparatus, and/or method may be utilized independently and separately from other components described herein. For example, each system may also be used in combination with other systems and is not limited to practice with only systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A load apparatus comprising:
   a load configured to convert mechanical rotational energy to electrical energy for a power output;
   a rotor assembly coupled to said load, wherein said rotor assembly comprises a rotor shaft that is configured to rotate within at least a portion of said load; and
   a quill shaft comprising a first end portion coupled to said rotor shaft and a second end portion comprising an interior portion and an exterior portion that substantially circumscribes at least a portion of said interior portion, said second end portion is configured to couple to a drive shaft of a machine such that said quill shaft is enabled to couple said rotor shaft to the drive shaft such that said rotor shaft is at least one of axially and radially isolated from the drive shaft to facilitate rotordynamic isolation between said load apparatus and the machine.

2. A load apparatus in accordance with claim 1, further comprising a control system coupled to said load, said control system comprises a controller that is configured to control channeling the power output in one of a first direction and a second direction, wherein the first direction is different from the second direction.

3. A load apparatus in accordance with claim 2, wherein said controller is configured to control channeling the power output in one of the first direction and the second direction based on a predefined threshold for the power output.

4. A load apparatus in accordance with claim 2, wherein said controller is configured to channel the power output in the first direction to facilitate energy absorption by an energy storage device, and said controller is configured to channel the power output in the second direction to facilitate energy use by the machine.

5. A load apparatus in accordance with claim 2, wherein said control system further comprises at least one sensor coupled to said controller, wherein said at least one sensor is configured to detect the power output.

6. A load apparatus in accordance with claim 1, further comprising a housing apparatus coupled to said load and to said rotor assembly such that said housing apparatus substantially encloses at least a portion of said load and at least a portion of said rotor assembly therein.

7. A load apparatus in accordance with claim 1, wherein said load comprises a high speed generator.

8. A load apparatus in accordance with claim 1, wherein said first end portion comprises a spline engagement member coupled to said rotor shaft.

9. A power system comprising:
   a machine comprising a drive shaft;
   a load apparatus coupled to said machine, wherein said load apparatus comprises:
   a load configured to convert mechanical rotational energy to electrical energy for a power output;
   a rotor assembly coupled to said load, wherein said rotor assembly comprises a rotor shaft that is configured to rotate within at least a portion of said load; and
   a quill shaft comprising a first end portion coupled to said rotor shaft and a second end portion comprising an interior portion and an exterior portion that substantially circumscribes at least a portion of said interior portion, said second end portion is configured to couple to said drive shaft such that said quill shaft is enabled to couple said rotor to said drive shaft such that said rotor shaft is at least one of axially and radially isolated from said drive shaft to facilitate rotordynamic isolation between said load apparatus and said machine; and
   an energy storage device coupled to said load apparatus.

10. A power system in accordance with claim 9, wherein said load apparatus further comprises a control system coupled to said load, said control system comprises a controller that is configured to control channeling the power output in one of a first direction and a second direction, wherein the first direction is different from the second direction.

11. A power system in accordance with claim 10, wherein said controller is configured to control channeling the power output in one of the first direction and the second direction based on a predefined threshold for the power output.

12. A power system in accordance with claim 10, wherein said controller is configured to channel the power output in the first direction to facilitate energy absorption by said energy storage device, and said controller is configured to channel the power output in the second direction to facilitate energy use by said machine.

13. A power system in accordance with claim 10, wherein said control system further comprises at least one sensor coupled to said controller, wherein said at least one sensor is configured to detect the power output.

14. A power system in accordance with claim 9, wherein said load apparatus further comprises a housing apparatus coupled to said load and to said rotor assembly such that said housing apparatus substantially encloses at least a portion of said load and at least a portion of said rotor assembly therein.

15. A power system in accordance with claim 9, wherein said load comprises a high speed generator.

16. A power system in accordance with claim 9, wherein said first end portion comprises a spline engagement member.

17. A method of using a load apparatus, said method comprising:
   providing a load that is configured to convert mechanical rotational energy to electrical energy for a power output;
   coupling a rotor assembly to the load, wherein the rotor assembly includes a rotor shaft that is configured to rotate within at least a portion of the load; and
   coupling first end portion of a quill shaft to the rotor shaft, wherein the quill shaft further includes a second end portion that includes an interior portion and an exterior portion that substantially circumscribes at least a portion of the interior portion, the second end portion is configured to couple to a drive shaft of a machine such that the quill shaft is enabled to couple the rotor shaft to the drive shaft such that the rotor shaft is at least one of axially and radially isolated from the drive shaft to facilitate rotordynamic isolation between the load apparatus and the machine.

18. A method in accordance with claim 17, further comprising channeling the power output in one of a first direction and a second direction that is different from the first direction via a control system coupled to the load, wherein the control system includes a controller.

19. A method in accordance with claim 18, wherein channeling the power output in one of a first direction and a second direction further comprises channeling the power output in one of the first direction and the second direction based on a predefined threshold for the power output.

20. A method in accordance with claim 18, wherein channeling the power output in one of a first direction and a second direction further comprises channeling the power output in one of the first direction to facilitate energy absorption by an energy storage device and the second direction to facilitate energy use by the machine.

* * * * *